United States Patent [19]

Engel et al.

[11] Patent Number: 5,063,036
[45] Date of Patent: Nov. 5, 1991

[54] PROCESS FOR PRODUCING PHASE-STABILIZED AMMONIUM NITRATE

[75] Inventors: Walter Engel, Wöschbach; Norbert Eisenreich, Pfinztal; Klaus-Dieter Thiel, Karlsruhe, all of Fed. Rep. of Germany

[73] Assignee: Fraunhofer-Gesellschaft zur Forderung der angenwandten Forschng e.V., Munich, Fed. Rep. of Germany

[21] Appl. No.: 542,059

[22] Filed: Jun. 22, 1990

[30] Foreign Application Priority Data

Jun. 28, 1989 [DE] Fed. Rep. of Germany ....... 3921098

[51] Int. Cl.$^5$ ............................................... C01C 1/18
[52] U.S. Cl. ...................................... 423/266; 423/396
[58] Field of Search ................................ 423/266, 396

[56] References Cited

U.S. PATENT DOCUMENTS

| | | | |
|---|---|---|---|
| 3,018,164 | 1/1962 | Guth | 423/266 |
| 4,001,377 | 1/1977 | Hahn et al. | 423/396 |
| 4,552,736 | 11/1985 | Mishra | 423/396 |

FOREIGN PATENT DOCUMENTS 879586 8/1971 Canada .................................. 423/396

OTHER PUBLICATIONS

F. J. Owens, "Electron Paramagnetic Resonance Study of the Role of CuO Additives in Altering Phase Transition Behaviour of Ammonium Nitrate", *J. Appl. Phys.* 53 (1), Jan. 1982, pp. 368-371.

*Primary Examiner*—Wayne A. Langel
*Attorney, Agent, or Firm*—Antonelli, Terry, Stout & Kraus

[57] ABSTRACT

In a process for producing phase-stabilized ammonium nitrate (AN), a diammine complex of Ni or Cu is incorporated into the AN lattice, in which the diammine complex is produced in a solid-state reaction of AN and metal oxide at 110° to 170° C. and in a proportion of up to 10% is either mixed with further AN and melted, homogenized and subsequently transferred into the solid state, or mixed with further AN is incorporated into the AN lattice at between 80° and 170° C. in a solid-state reaction.

9 Claims, No Drawings

PROCESS FOR PRODUCING PHASE-STABILIZED AMMONIUM NITRATE

The invention relates to a process for producing phase-stabilized ammonium nitrate (AN) by incorporating a diammine complex of Ni or Cu into the AN lattice, the diammine complex being obtained by reacting the metal oxide with AN, is mixed with up to 10% further AN, melted, homogenized and subsequently transferred into the solid state.

Ammonium nitrate is used as an oxidizer in propellants and explosives, but suffers from the disadvantage that, as a function of the temperature, it occurs in several different modifications linked with the density or volume changes, so that stress and crack formations can occur in the propellant or explosive. Additives of numerous different types have been proposed for the phase stabilization of ammonium nitrate and in particular metal-ammine complexes and in particular ammine complexes of Cu, Ni and Zn have proved satisfactory (DE-A-17 67 757, 21 25 755 and 36 42 850).

By melting a mixture of ammonium nitrate and metal oxide, it is possible to incorporate the ammine complex into the AN lattice and in this way obtain a phase-stabilized ammonium nitrate. It is possible to proceed in such a way (DE-A-21 25 755), that ammonium nitrate is mixed with up to 10% of the metal oxide and melted and then the melt is transferred into the solid state. This process suffers from the disadvantage that the diammine complex is only inadequately incorporated into the AN lattice. The main reason is that the reaction of metal oxide and AN takes place very slowly and the diammine complex decomposes at elevated temperature, namely the melting point of ammonium nitrate. Thus, the formation frequency and simultaneous decomposition are in competition with one another and the process does not lead to satisfactory results.

In another known process (DE-A-36 42 850), the diammine complex of Ni or Cu is formed via a tetraammine complex in the following way:

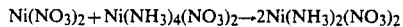

$$Ni(NO_3)_2 + Ni(NH_3)_4(NO_3)_2 \rightarrow 2Ni(NH_3)_2(NO_3)_2$$

The tetraammine complex required for this purpose must previously be prepared in aqueous solution from nickel salt and ammonia. As a result of the precipitation, suction filtering and drying of the complex this step is labour intensive. It is accompanied by the necessary working up or environmentally acceptable elimination of the residual solution with the heavy metal salt. The diammine complex is then mixed with solid ammonium nitrate and metal nitrate, the mixture is melted and is subsequently e.g. atomized. Only anhydrous metal nitrate can be used. However, as a result of its hygroscopy, during the dosing in it attracts water and tends to form lumps.

The problem of the invention is to propose a process, in which on the one hand it is possible to obviate the roundabout route via a liquid phase for the production of the diammine complex and on the other hand the decomposition of said complex is at least substantially reduced.

On the basis of the aforementioned process, this problem is solved in that the diammine complex is produced in a solid-state reaction of CuO or Ni$_2$O$_3$ with AN at 110° to 170° C.

It has surprisingly been found that the diammine complex can be prepared in a solid-state reaction, in that the mixture of AN and metal oxide is kept in contact for a certain time at 110° to 170° C. This can e.g. take place in a rotary kiln and can in particular be performed continuously. The Cu (II) diffuses into the AN lattice and the diammine complex is formed, accompanied by the removal of water. The diammine complex can then be added to the further ammonium nitrate, the mixture then being melted, homogenized and brought into the solid state. However, it is also possible to carry out the solid-state reaction with a corresponding ammonium nitrate excess and following the contact time necessary for diammine complex formation, the temperature is raised to the melting point. There is little or no diammine complex decomposition.

According to a further development of the invention, the problem of the invention can also be solved, whilst completely obviating a melting process, in that the diammine complex is produced in a solid-state reaction of AN and CuO or Ni$_2$O$_3$ at 110° to 170° C. and is incorporated into the AN lattice with a proportion of up to 10% mixed with further AN at a temperature between 80° and 170° C.

Thus, as a result of this inventive solution, not only is the diammine complex produced, but the complete phase-stabilized ammonium nitrate is produced exclusively through solid-state reactions at temperatures below the melting point of the ammonium nitrate, in that from said ammonium nitrate and the metal oxide the diammine complex is formed and is incorporated into the AN lattice at substantially the same temperature.

This process can be performed in a two-stage manner, i.e. preparation of the diammine complex and subsequent incorporation into the AN lattice, or in a single stage by working with a corresponding AN excess.

Compared with the known procedure, both inventive processes permit a continuous production and can in particular be performed on an industrial scale.

The diammine complex can be prepared in relatively pure form from AN and CuO or Ni$_2$O$_3$ in a stoichiometric molar ratio of 2:1 and is subsequently admixed to the further AN.

As stated hereinbefore, instead of this, the diammine complex can be prepared in a mixture of AN and CuO or Ni$_2$O$_3$ with an AN excess up to a molar ratio of 8:1 and is then immediately incorporated into the AN lattice and further processed in the described manner. The AN residue left behind after the reaction is not prejudicial to the further processing, because in any case further AN is mixed in. As a result of this procedure the metal oxide is more easily completely reacted.

Performance examples will now be described:

EXAMPLE 1

Ammonium nitrate, prepared from the melt and phase-stabilized with diammine-Ni (II), (3% Ni$_2$O$_3$).

0.75 kg of Ni$_2$O$_3$ are mixed with 2.9 kg of AN, i.e. double the stoichiometric quantity and kept for 2.5 h in the drying oven at 120° C. The product which, apart from unreacted AN, contains the diammine-nickel complex formed, is mixed with a further 21.35 kg of AN and melted. The melt at 180° C. is immediately transferred into the dry state by spraying.

EXAMPLE 2

Ammonium nitrate (AN), prepared from the melt, phase-stabilized with diammine-Cu (II) (3% CuO).

0.75 kg of CuO are mixed with 3 kg of AN, i.e. double the stoichiometric quantity, and kept for 2 h at 130° C. in the drying oven. The product which, apart from unreacted AN, contains diammine-copper nitrate, is melted with a further 21.25 kg of AN and the melt at 180° C., immediately after melting, is transferred into the solid state by spraying.

EXAMPLE 3

Ammonium nitrate, phase-stabilized by diammine-Cu (II) (3%), prepared only by solid-state reaction.

60g of CuO are mixed with 1.94 kg of AN and kept for 2.5 h at 130° C. in the drying oven. The product is comminuted after cooling. It has the characteristics of phase-stabilized ammonium nitrate.

We claim:

1. Process for producing phase-stabilized ammonium nitrate (AN) by incorporating a diammine complex of Ni or Cu into the AN lattice, the diammine complex being obtained by reacting CuO or $Ni_2O_3$ with AN, followed by mixing of the diammine complex with further AN to form a mixture containing up to 10% of the diammine complex, melting the mixture, homogenizing and subsequently bringing into the solid state, characterized in that the diammine complex is produced in a solid-state reaction of CuO or $Ni_2O_3$ and AN at a temperature of 110° to 170° C. for a time sufficient to form the diammine complex.

2. Process according to claim 1, characterized in that the preparation of the diammine complex, the dosing to the AN and the incorporation in the AN lattice to phase-stabilized AN are performed continuously.

3. Process for producing phase-stabilized ammonium nitrate (AN) by incorporating a diammine complex of Ni or Cu into the AN lattice, in which the diammine complex is obtained by reacting CuO or $Ni_2O_3$ with AN, characterized in that the diammine complex is produced in a solid-state reaction of AN and CuO or $Ni_2O_3$ at 110° to 170° C. for a time sufficient to form the diammine complex and, mixed with further AN to form a mixture containing up to 10% of the diammine complex, and the diammine complex is then incorporated into the AN lattice at a temperature between 80° and 170° C.

4. Process according to claim 1 or 3, characterized in that the diammine complex of AN and CuO or $Ni_2O_3$ is prepared in a stoichiometric molar ratio of 2:1 and is then continuously admixed with the further AN.

5. Process according to claim 1 or 3, characterized in that the diammine complex is prepared in a mixture of AN and CuO or $Ni_2O_3$ with an AN excess up to a molar ratio of 8:1.

6. Process according to claim 3, characterized in that the preparation of the diammine complex, the dosing to the AN and the incorporation in the AN lattice to phase-stabilized AN are performed continuously.

7. Process according to claim 4, characterized in that the preparation of the diammine complex, the dosing to the AN and the incorporation in the AN lattice to phase-stabilized AN are performed continuously.

8. Process according to claim 5, characterized in that the preparation of the diammine complex, the dosing to the AN and the incorporation in the AN lattice to phase-stabilized AN are performed continuously.

9. Process for producing phase-stabilized ammonium nitrate (AN) by incorporating a diammine complex of Ni or Cu into the AN lattice, comprising mixing CuO or $Ni_2O_3$ with the total AN quantity and heating the mixture to 110° to 170° C. for a time sufficient to produce said diammine complex in a solid-state reaction of CuO or $Ni_2O_3$ and AN and to directly incorporate the diammine complex into the AN lattice.

* * * * *